United States Patent
Jiang et al.

(10) Patent No.: US 11,410,275 B2
(45) Date of Patent: Aug. 9, 2022

(54) VIDEO CODING FOR MACHINE (VCM) BASED SYSTEM AND METHOD FOR VIDEO SUPER RESOLUTION (SR)

(71) Applicant: Tencent America LLC, Palo Alto, CA (US)

(72) Inventors: Wei Jiang, San Jose, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/023,055

(22) Filed: Sep. 16, 2020

(65) Prior Publication Data

US 2021/0090217 A1 Mar. 25, 2021

Related U.S. Application Data

(60) Provisional application No. 62/904,647, filed on Sep. 23, 2019.

(51) Int. Cl.
*G06T 3/40* (2006.01)
*G06N 3/04* (2006.01)
*G06K 9/62* (2022.01)

(52) U.S. Cl.
CPC .......... *G06T 3/4053* (2013.01); *G06K 9/6288* (2013.01); *G06N 3/04* (2013.01); *G06T 2207/10016* (2013.01)

(58) Field of Classification Search
CPC ......... G06T 3/4053; G06T 2207/10016; G06T 3/4046; G06T 5/50; G06N 3/04; G06N 3/0454; G06K 9/6288; G06K 9/4628; H04N 21/2343; H04N 21/4402
See application file for complete search history.

(56) References Cited

U.S. PATENT DOCUMENTS 10,713,821 B1 * 7/2020 Surya .................... G06N 3/0472
11,074,671 B2 * 7/2021 Lee ......................... G06T 3/4046
(Continued)

FOREIGN PATENT DOCUMENTS

CN 108495128 A * 9/2018
WO WO-2021172956 A1 * 9/2021

OTHER PUBLICATIONS https://www.mpegstandards.org/standards/.*
(Continued)

*Primary Examiner* — Charles T Shedrick
(74) *Attorney, Agent, or Firm* — Anova Law Group, PLLC (57) ABSTRACT

A video super resolution (SR) method based on video coding for machine (VCM) is provided for an electronic device. The method includes obtaining a lower resolution (LR) video; generating feature representations of the LR video based on a deep neural network (DNN); encoding the feature representations of the LR video, based on a VCM standard, and the LR video to form encoded feature representations of the LR video and an encoded LR video, wherein the feature representations of the LR video contain both space and temporal information on the LR video for creating a high resolution (HR) video corresponding to the LR video; and storing and transferring the encoded feature representations of the LR video and an encoded LR video for decoding.

16 Claims, 9 Drawing Sheets

(56) References Cited

U.S. PATENT DOCUMENTS

| | | | | |
|---|---|---|---|---|
| 2011/0007137 | A1* | 1/2011 | Rohaly | G06V 20/64 |
| | | | | 348/E13.074 |
| 2018/0101957 | A1* | 4/2018 | Talathi | G06V 10/40 |
| 2018/0332301 | A1* | 11/2018 | Tian | H04N 19/172 |
| 2021/0090217 | A1* | 3/2021 | Jiang | G06V 10/454 |

OTHER PUBLICATIONS https://mpeg.chiariglione.org/standards/exploration/video-coding-machines.*
https://www.cnx-software.com/2019/08/27/mpeg-video-coding-for-machines-vcm-is-in-the-works/.*
Younghyun Jo et al., "Deep Video Super-Resolution Network Using Dynamic Upsampling Filters Without Explicit Motion Compensation," Proceedings of the IEEE Conference on Computer Vision and Pattern Recognition, 2018, pp. 3224-3232. 9 pages.
Xintao Wang et al., "EDVR: Video Restoration with Enhanced Deformable Convolutional Networks," Proceedings of the IEEE/CVF Conference on Computer Vision and Pattern Recognition (CVPR) Workshops, 2019, pp. 1-10. 10 pages.
Xizhou Zhu et al., "Deformable ConvNets v2: More Deformable, Better Results," Proceedings of the IEEE/CVF Conference on Computer Vision and Pattern Recognition (CVPR), 2019, pp. 9308-9316 9 pages.

* cited by examiner

VIDEO CODING FOR MACHINE (VCM) BASED SYSTEM AND METHOD FOR VIDEO SUPER RESOLUTION (SR)

RELATED APPLICATION

This application claims priority to U.S. provisional patent application No. 62/904,647, filed on Sep. 23, 2019, content of which is incorporated by reference in its entirety.

FIELD OF THE TECHNOLOGY

This application relates to the field of video technologies and, specifically, to a system and method for video coding for machine (VCM) for video super resolution.

BACKGROUND

ISO/IEC MPEG (JTC 1/SC 29/WG 11) has been actively searching for potential needs for standardization of video coding technology for visual analysis and understanding. The Compact Descriptors for Visual Search (CDVS) standard was adopted by ISO in 2015 as a still-image standard, which extracts feature representations for image similarity matching. The Compact Descriptors for Visual Analysis (CDVS) standard is listed as Part 15 of MPEG 7 and ISO/IEC 15938-15 and was finalized in 2018, which extracts global and local, hand-designed and Deep neural network (DNN)-based, feature descriptors for video segments. The DNN is successfully applied in a large range of video applications such as semantic classification, target detection/recognition, target tracking, video quality enhancement, etc. MPEG is also working on the Coded Representation of Neural Network standard (NNR), which encode DNN models to save both storage and computation.

Recently, a group was formed for the Video Coding for Machine (VCM) standard to explore the topic of "compression coding for machine vision as well as compression for human-machine hybrid system," targeting at developing a standard that can be implemented in chips for broad use with any video-related Internet of Things (IoT) devices. Compared with the previous CDVA and CDVS, VCM is an emerging video for machine standard that can be viewed as a superset of CDVA. Through combining multiple feature maps of a neural network backbone, VCM can handle more advanced visual analysis tasks such as object detection and segmentation. However, detailed implementation of VCM is generally lacking.

The disclosed methods and systems are directed to solve one or more problems set forth above and other problems.

SUMMARY

One aspect of the present disclosure includes a video super resolution (SR) method based on video coding for machine (VCM) is provided for an electronic device. The method includes obtaining a lower resolution (LR) video; generating feature representations of the LR video based on a deep neural network (DNN); encoding the feature representations of the LR video, based on a VCM standard, and the LR video to form encoded feature representations of the LR video and an encoded LR video, wherein the feature representations of the LR video contain both space and temporal information on the LR video for creating a high resolution (HR) video corresponding to the LR video; and storing and transferring the encoded feature representations of the LR video and an encoded LR video for decoding.

Another aspect of the present disclosure includes a video super resolution (SR) system based on video coding for machine (VCM). The system includes an electronic device, and the electronic device is configured to perform: obtaining a lower resolution (LR) video; generating feature representations of the LR video based on a deep neural network (DNN); encoding the feature representations of the LR video, based on a VCM standard, and the LR video to form encoded feature representations of the LR video and an encoded LR video, wherein the feature representations of the LR video contain both space and temporal information on the LR video for creating a high resolution (HR) video corresponding to the LR video; and storing and transferring the encoded feature representations of the LR video and an encoded LR video for decoding.

Other aspects of the present disclosure can be understood by those skilled in the art in light of the description, the claims, and the drawings of the present disclosure.

DETAILED DESCRIPTION

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Video Coding for Machines (VCM): VCM refers to video coding with consideration for machine vision, such as autonomous driving. A VCM standard refers to a set of rules, algorithms, and protocols to different types of devices or devices from different providers to implement VCM video applications.

Internet of Things (IoT): The Internet of things (IoT) is a system of interrelated computing devices, mechanical and digital machines provided with unique identifiers (UIDs) and the ability to transfer data over a network without requiring human-to-human or human-to-computer interaction.

High Resolution (HR): HR describes an image or video displayed at high DPI (dots per inch), which contains a high amount of visual information.

Low Resolution (LR): Relative to HR, describes an image or video displayed at low DPI, which contains a low amount of visual information.

Super-Resolution (SR): SR is a class of techniques that enhance or increase the resolution of an image system or an image/video.

Deep Neural Network (DNN): A deep neural network (DNN) is an artificial neural network (ANN) with multiple layers between the input and output layers. The DNN finds the correct mathematical manipulation to turn the input into the output, which may be a linear relationship or a non-linear relationship.

Compact Descriptors for Visual Search (CDVS): CDVS involves technologies related to descriptions of the features of the contents in images, videos, or algorithms or applications that produce such descriptions for visual search applications.

Compact Descriptors for Visual Analysis (CDVA): CDVA involves technologies related to descriptions of the features of the contents in images, videos, or algorithms or applications that produce such descriptions for visual analysis applications.

Coded Representation of Neural Network (NNR): NNR involves technologies for compression of neural networks for multimedia content description and analysis.

Figure 1:
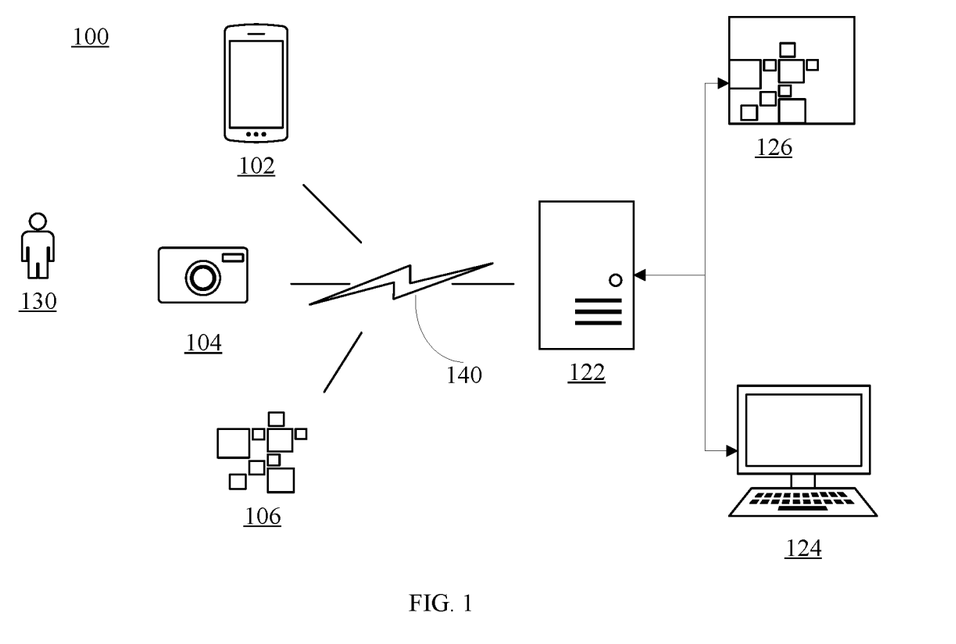
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a terminal device 102, a camera device 104, and an internet of things (IoT) device 106. Other types of devices may also be included.

The operating environment 100 may also include a server 122, a human vision application 124, a machine vision application 126, and a communication link 140 connecting the variety of devices to the server 122. A user 130 may use, access, or control one or more of the variety of devices.

The terminal device 102 may include any user terminal, such as a personal digital assistant (PDA), a mobile phone, a smart phone, an integrated messaging device (IMD), a tablet computer, a notebook computer, a desktop computer 20, and other computing devices. The camera device 104 may include any image or video capturing devices, such as a digital camera, a video camera, a security camera, a vehicle on-board camera, and a stereo camera, etc. The IoT device 106 may include any type of IoT device with a camera function, such as a digital doorbell, an autonomous driving sensor, a digital voice assistant, a smart speaker, a smart appliance, and any industrial or commercial IoT systems. Any of the variety of devices 102, 104, and 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

Figure 2:
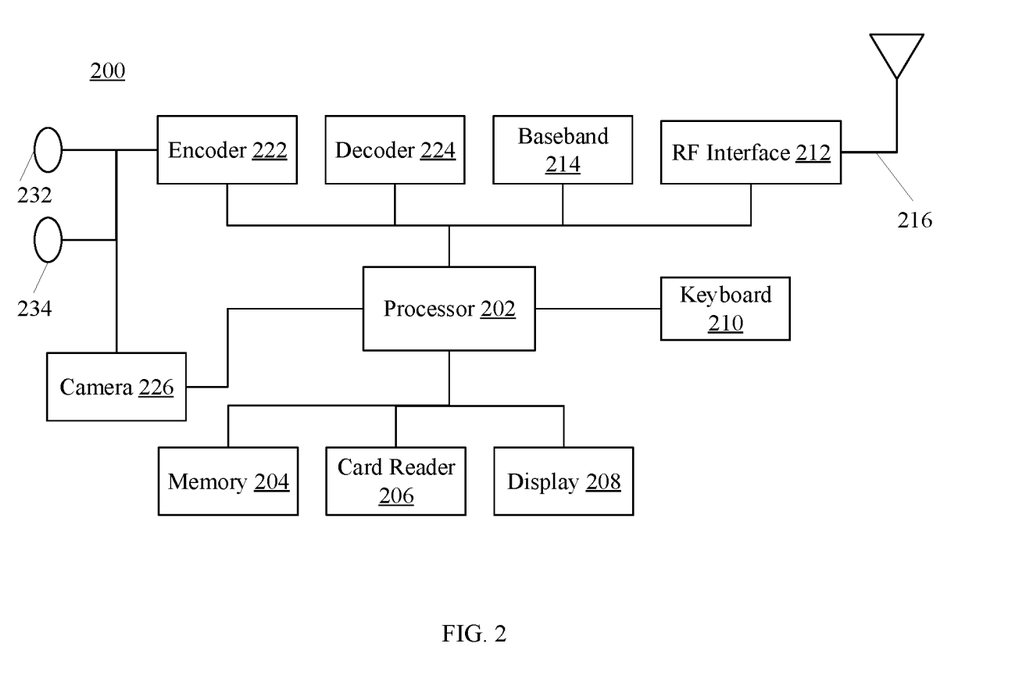
FIG. 2 illustrates an electronic device consistent with embodiments of the present disclosure.

FIG. 2 shows an electronic device for implementing any of the variety of devices 102, 104, and/or 106. As shown in FIG. 2, the electronic device 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the electronic device 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the electronic device 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the electronic device 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The electronic device 200 as shown in FIG. 2 may include structures similar to those of a mobile terminal or user equipment of a wireless communication system. However, any electronic device or apparatus which may require encoding and decoding, or encoding or decoding video or images may be included.

Returning to FIG. 1, the electronic device 200 (i.e., any one or more of the variety of devices 102, 104, and/or 106) may capture or collect various data (e.g., audio data, environment/operating data, image data, and/or video data) and send the data to the server 122 through the communication link 140. The electronic device 200 may process or pre-process the data before sending the data to the server 122, or may send the unprocessed data to the server 122.

The communication link 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

Figure 3:
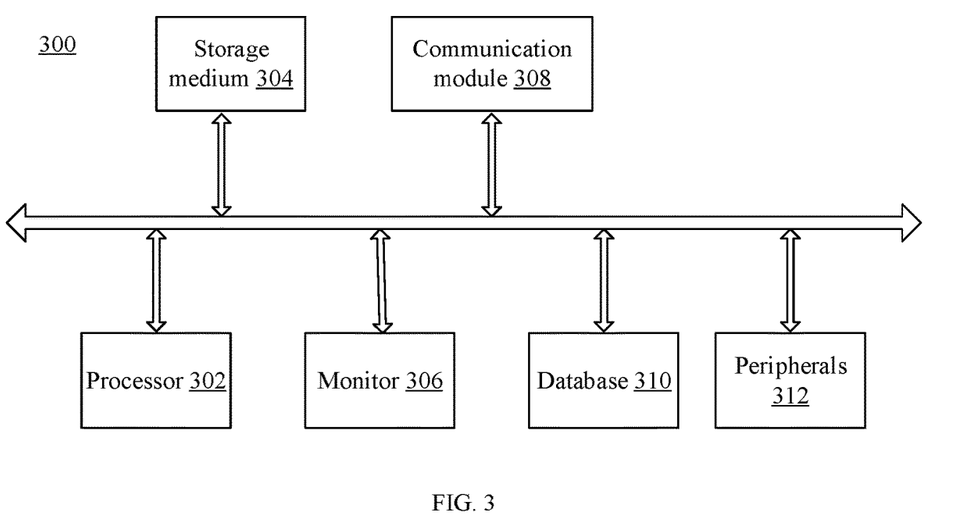
FIG. 3 illustrates a computer system consistent with embodiments of the present disclosure.

The server 122 may include any type of server computer system or multiple computer systems configured in a server cluster or distributed in different locations. The server 122 may also include a cloud server on a cloud computing platform. The server 122 may also be referred as a server entity, which may be integrated with any appropriate device (including the electronic device) for performing the disclosed server-side functionalities of video decoding and application processing. FIG. 3 illustrates an exemplary computer system implementing certain aspects of server 122.

As shown in FIG. 3, computer system 300 may include a processor 302, storage medium 304, a monitor 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as Read-only Memory (ROM), Random Access Memory (RAM), flash memory modules, and erasable and rewritable memory, and mass storages, such as CD-ROM, U-disk, and hard disk, etc. Storage medium 304 may store computer programs for implementing various processes, when executed by processor 302.

Further, peripherals 312 may include I/O devices such as a keyboard and a mouse. Communication module 308 may include network devices for establishing connections through the communication network 703. Database 310 may include one or more databases for storing certain data and for performing certain operations on the stored data, such as database searching.

Returning to FIG. 1, the server 122 may include or may connect with the human vision application 124 and the machine vision application 126. The human vision application 124 may include a user terminal device and/or an application running on the user terminal device or the server 122 for providing functionalities associated with human vision, such as image display, video playback, or video monitoring, etc. The machine vision application 126 may include a control device and/or an application running on the control device or the server 122 for providing functionalities associated with machine vision, such as autonomous driving, image/video search and/or analysis, etc.

In operation, the electronic device 200, the server 122, the human vision application 124, and/or the machine vision application 126 may implement video super resolution (SR) processes based on video coding for machine (VCM) techniques.

With the increasing popularity of high-resolution (HR) video display, such as 4K(3840×2160) and 8K(7680×4320) resolutions, the video SR process may be used to generate the matching HR video content. That is, the video SR is to generate a high-resolution (HR) video from a corresponding low-resolution (LR) video. The cost of creating an HR video with DNN-based methods is relatively high for end users. For example, most end users take videos using smart phones. Due to the limited storage, it is often impractical to save an HR video on the smart phones. It is also often impractical to send a huge amount of video data over cellular networks. Besides, the small screens of the smart phones make it unnecessary to generate an HR video on the smartphones. Thus, the present disclosure provides technical solutions to separate the process of video capture, video storage, video transfer, and video generation.

Specifically, during operation, the electronic device 200 may generate or collect LR videos, and the electronic device 200 and the server 122 may coordinate with each other to use the video SR process to generate HR video content corresponding to the LR videos. That is, regular LR videos (e.g., regular 1080×1920 resolution videos) are captured on the electronic device, and proper representations are extracted from the LR video. Such representations may be stored and transferred through networks, and the HR videos are generated later-on by the server or when needed.

Figure 4:
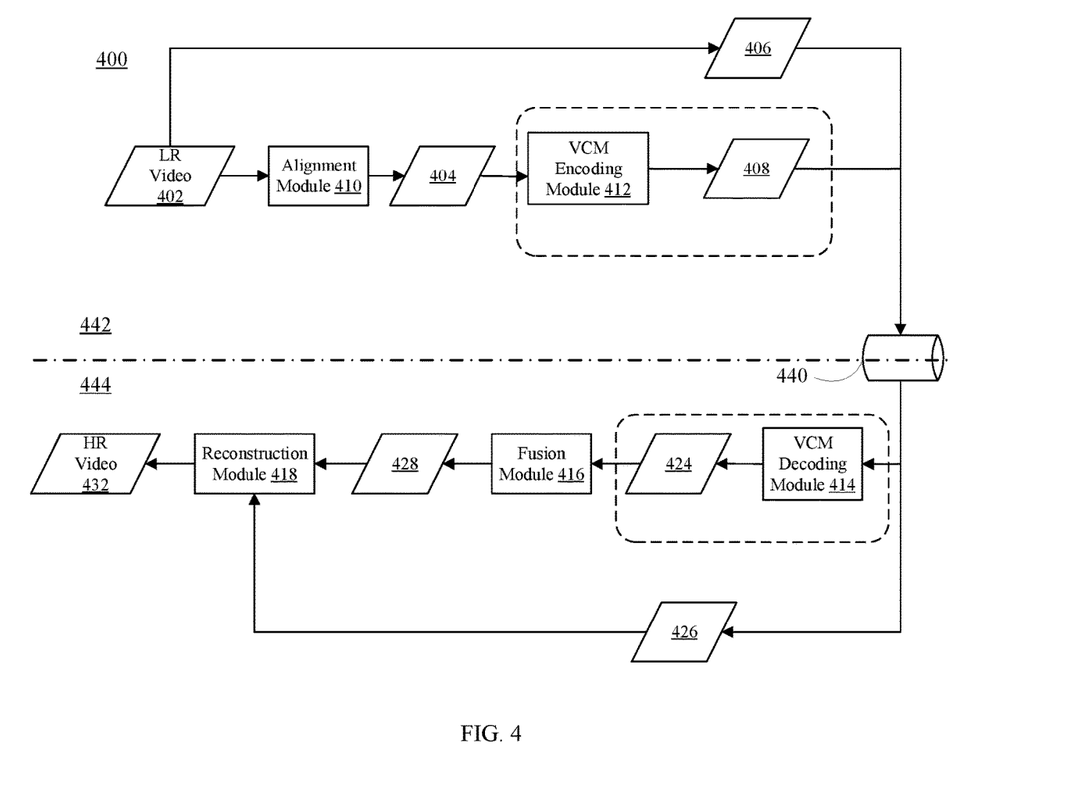
FIG. 4 illustrates a video SR system consistent with embodiments of the present disclosure.

FIG. 4 illustrates an exemplary video SR system for performing a video SR process consistent with the disclosed embodiments of the present disclosure. As shown in FIG. 4, the video SR system 400 may include an encoder 442, a decoder 444, and a storage and/or transfer component 440. In certain embodiments, the encoder 442 may be implemented by the electronic device 200, the decoder may be implemented by the server 122, and the storage and/or transfer component 440 may be implemented by either or both the electronic device 200 and the server 122. In certain other embodiments, the electronic device 200 or the server 122 may implement both the encoder 442 and the decoder 444 as a codec for video processing.

The encoder 442 may include an alignment module 410 and a VCM encoding module 412 (or a VCM encoder). The alignment module 410 is configured to align multiple frames from the LR video 402. Optionally, the encoder 442 may include a feature extraction module (not shown) that extracts motion features from multiple video frames, and the alignment module 410 aligns these frames by matching the extracted features. In certain embodiment, the alignment module 410 may directly learn alignment filters to align multiple frames without extracting motion features explicitly, without using the feature extraction module.

More specifically, based on the LR video, the alignment module 410 may generate a feature representation of aligned frames 404, and the LR video may also be encoded by a separate encoder (not shown) to generate encoded LR video 406. Further, the VCM encoding module 412 may encode the feature representation of aligned frames 404 to generate an encoded feature representation of aligned frames 408 using, for example, a DNN-based method. Both the encoded LR video 406 and the encoded feature representation of aligned frames 408 may be received by the decoder 444 via the storage and/or transfer component 440.

The decoder 444 may include a VCM decoding module 414 (a VCM decoder), a fusion module 416, and a reconstruction module 418. After receiving the encoded LR video 406 and the encoded feature representation of aligned frames 408, the VCM decoding module 414 may decode the encoded feature representation of aligned frames 408 to generate decoded feature representation of aligned frames 424. The encoded LR video 406 may also be decoded by a decoder (not shown) to generate decoded LR video 426.

The fusion module 416 may be configured to perform a fusion process to combine or fuse feature representations from the aligned frames. That is, the fusion module 416 may combine the decoded feature representations of aligned frames 424 to generate a fused feature representation 428.

The reconstruction module 418 may be configured to use the fused feature representation and a decoded downsampled LR video to generate an HR video. That is, the reconstruction module 418 may perform a reconstruction process to generate the corresponding HR frames 432 based on the fused feature representations 428 and the decoded LR video frames 426.

Figure 5:
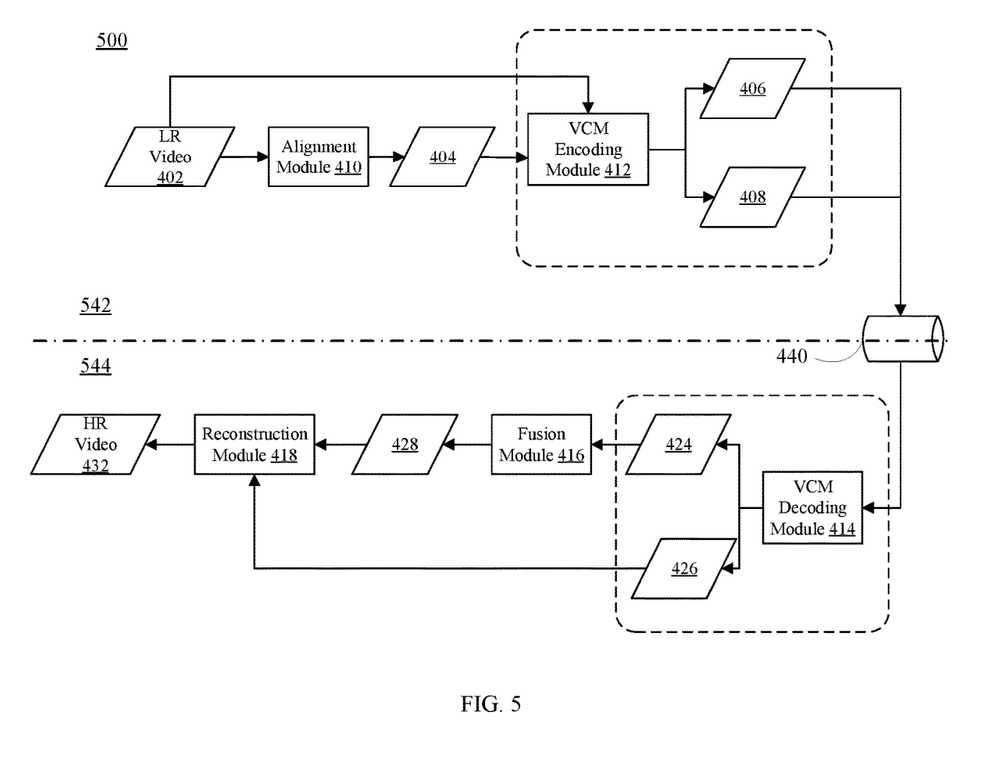
FIG. 5 illustrates another video SR system consistent with embodiments of the present disclosure.

FIG. 5 illustrates another exemplary video SR system consistent with the disclosed embodiments of the present disclosure. As shown in FIG. 5, the video SR system 500 may include an encoder 542, a decoder 544, and a storage and/or transfer component 440. The encoder 542 may include an alignment module 410 and a VCM encoding module 412. The alignment module 410 is configured to align multiple frames from the LR video 402 and generates a feature representation of aligned frames 404 based on the LR video.

The VCM encoding module 412 may encode the feature representation of aligned frames 404 to generate an encoded feature representation of aligned frames 408 using, for example, a DNN-based method. The VCM encoding module 412 may also encode the LR video 402 to generate the encoded LR video 406. Both the encoded LR video 406 and the encoded feature representation of aligned frames 408 may be received by the decoder 444 via the storage and/or transfer component 440.

The decoder 544 may include a VCM decoding module 414, a fusion module 416, and a reconstruction module 418. After receiving the encoded LR video 406 and the encoded feature representation of aligned frames 408, the VCM decoding module 414 may decode the encoded feature representation of aligned frames 408 to generate decoded feature representation of aligned frames 424. Further, the VCM decoding module 414 may also decode the encoded LR video 406 to generate the decoded LR video 426.

The fusion module 416 may combine the decoded feature representations of aligned frames 424 to generate a fused feature representation 428. The reconstruction module 418 may generate the corresponding HR frames 432 based on the fused feature representations 428 and the decoded LR video frames 426.

Figure 6:
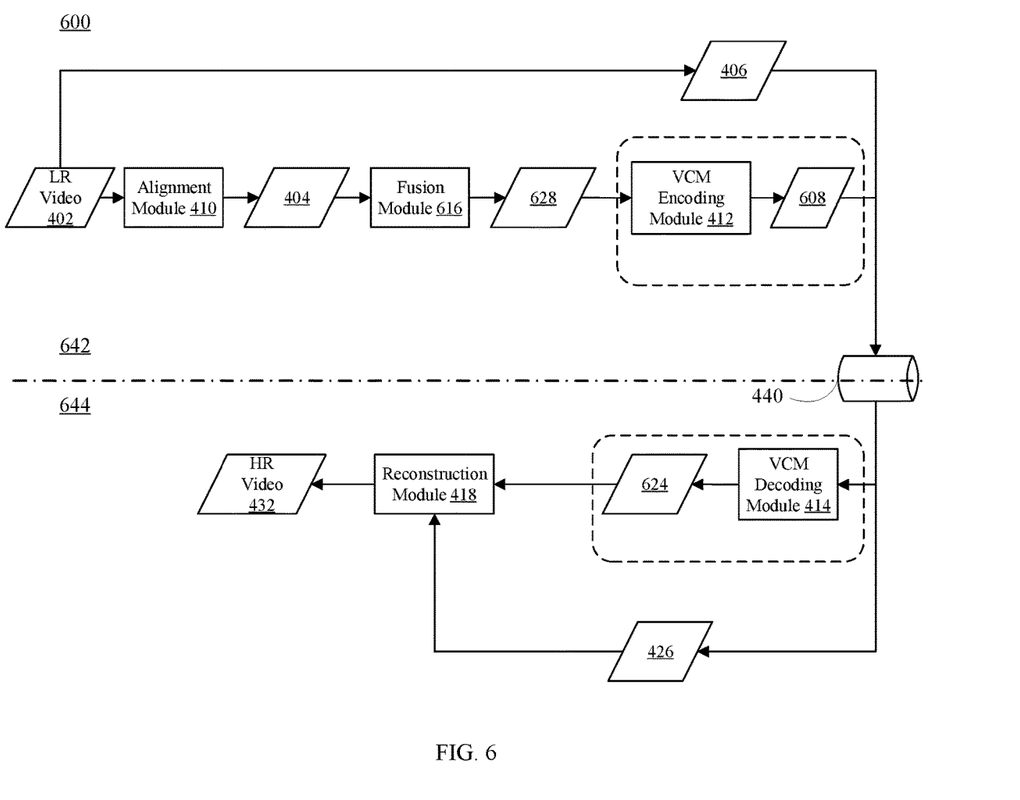
FIG. 6 illustrates another video SR system consistent with embodiments of the present disclosure.

FIG. 6 illustrates another exemplary video SR system consistent with the disclosed embodiments of the present disclosure. As shown in FIG. 6, the video SR system 600 may include an encoder 642, a decoder 644, and a storage and/or transfer component 440. The encoder 642 may include an alignment module 410, a fusion module 616, and a VCM encoding module 412. The alignment module 410 is configured to align multiple frames from the LR video 402 and generates a feature representation of aligned frames 404 based on the LR video 402. The LR video 402 may also be encoded by a separate encoder (not shown) to generate encoded LR video 406.

Further, the fusion module 616 may fuse the feature representations of aligned frames 404 to generate a fused feature representation 628 based on the feature representation of aligned frames 404. The VCM encoding module 412 may encode the fused feature representation 628 to generate an encoded fused feature representation 608. Both the encoded LR video 406 and the encoded fused feature representation 608 may be received by the decoder 644 via the storage and/or transfer component 440.

The decoder 644 may include a VCM decoding module 414 and a reconstruction module 418. After receiving the encoded LR video 406 and the encoded fused feature representation 608, the VCM decoding module 414 may decode the encoded fused feature representation 608 to generate decoded fused feature representation 624. The encoded LR video 406 may also be decoded by a decoder (not shown) to generate decoded LR video 426. Further, the reconstruction module 418 may generate the corresponding HR frames 432 based on the decoded fused feature representations 624 and the decoded LR video frames 426.

Figure 7:
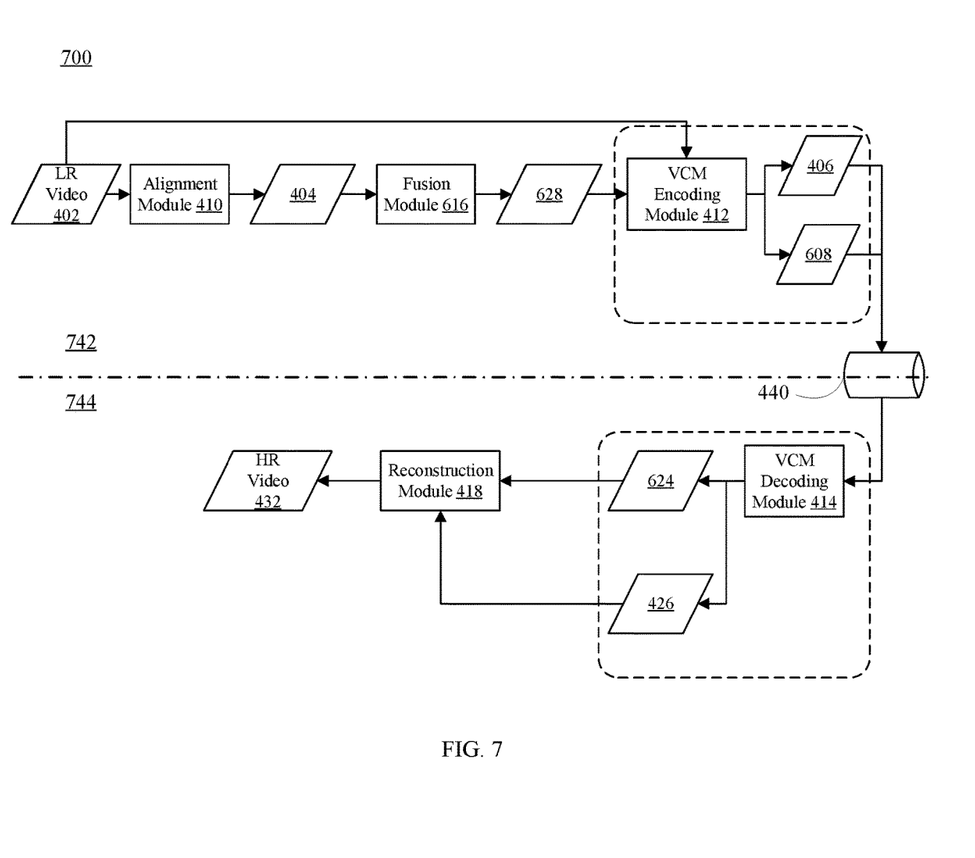
FIG. 7 illustrates another video SR system consistent with embodiments of the present disclosure.

FIG. 7 illustrates another exemplary video SR system consistent with the disclosed embodiments of the present disclosure. As shown in FIG. 7, the video SR system 700 may include an encoder 742, a decoder 744, and a storage and/or transfer component 440. The encoder 742 may include an alignment module 410, a fusion module 616, and a VCM encoding module 412. The alignment module 410 is configured to align multiple frames from the LR video 402 and generates a feature representation of aligned frames 404 based on the LR video 402.

Further, the fusion module 616 may fuse the feature representations of aligned frames 404 to generate a fused feature representation 628 based on the feature representation of aligned frames 404. The VCM encoding module 412 may encode the fused feature representation 628 to generate an encoded fused feature representation 608. The VCM encoding module 412 may also encode the LR video 402 to generate encoded LR video 406. Both the encoded LR video 406 and the encoded fused feature representation 608 may be received by the decoder 744 via the storage and/or transfer component 440.

The decoder 744 may include a VCM decoding module 414 and a reconstruction module 418. After receiving the encoded LR video 406 and the encoded fused feature representation 608, the VCM decoding module 414 may decode the encoded fused feature representation 608 to generate decoded fused feature representation 624. The VCM decoding module 414 may also decode the encoded LR video 406 to generate decoded LR video 426. Further, the reconstruction module 418 may generate the corresponding HR frames 432 based on the decoded fused feature representations 624 and the decoded LR video frames 426.

It should be noted that the various video SR systems are described above for illustrative purposes, other configurations may also be used. In operation, the video SR systems may implement certain video SR processes consistent with the disclosed embodiments of the present disclosure.

Figure 8:
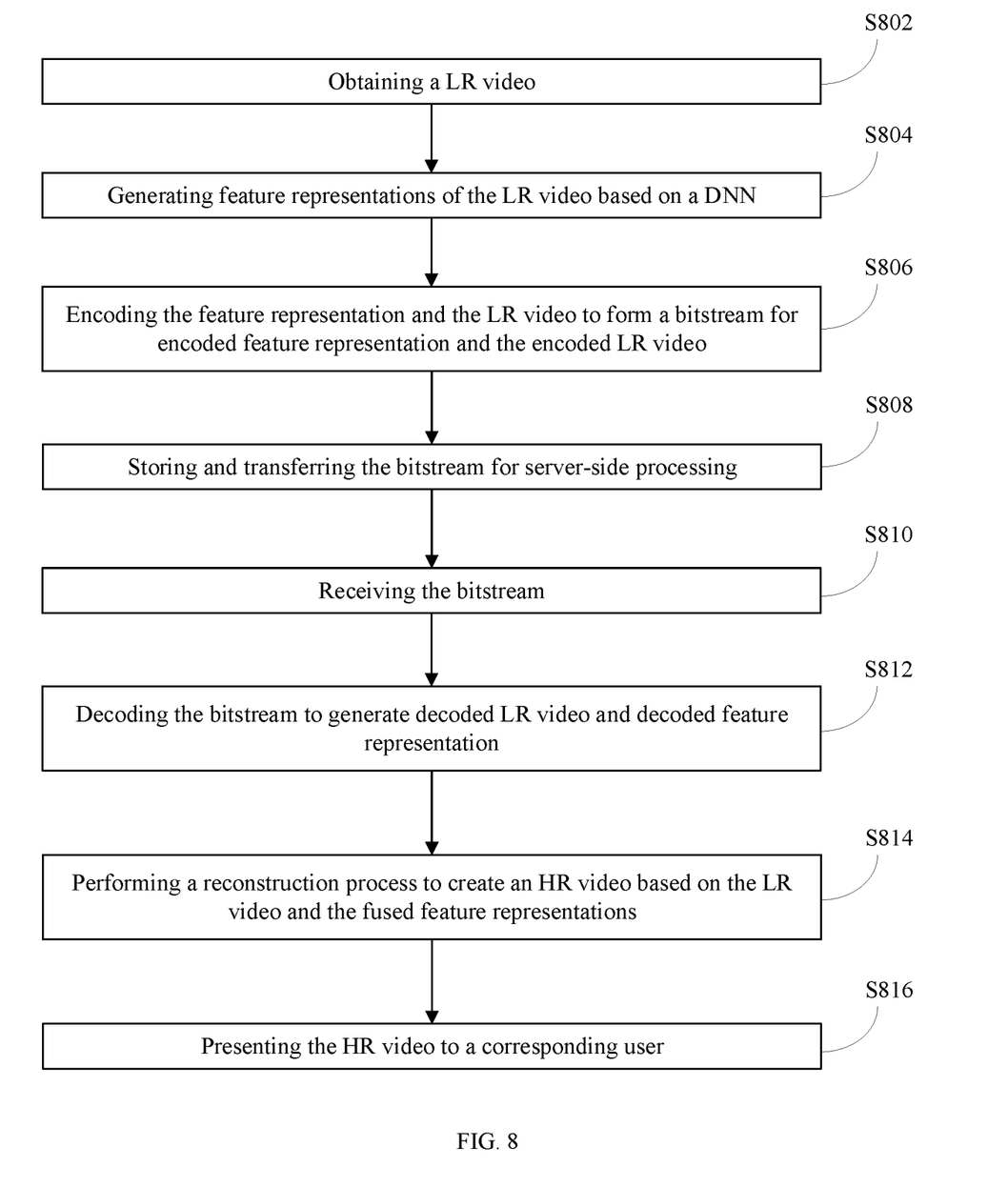
FIG. 8 illustrates an SR process consistent with embodiments of the present disclosure.

FIG. 8 illustrates an exemplary video SR process consistent with the disclosed embodiments of the present disclosure. The video SR process may be performed by any one or more video SR systems described above and incorporated into for example an electronic device 200.

As shown in FIG. 8, at the beginning, an electronic device 200 may obtain an LR video (S802). For example, a user may use a smartphone or a digital camera to capture an LR video, or a digital device with a camera function (e.g., a doorbell or a security monitor) may capture an LR video. In certain embodiments, the LR video may also be received or download from another source via a network by the electronic device or may be stored locally on the electronic device.

After obtaining an LR video, the electronic device 200 may generate feature representations of the LR video based on a DNN (S804). That is, the electronic device 200 may use the VCM standard to generate the feature representations for the LR video.

A feature may refer to a piece of information which is relevant for solving the computational task related to a certain application, such as imaging analysis or object detection. Features may be specific structures in the image such as points, edges, or objects. Features may also be related to motion in image sequences, to shapes defined in terms of curves or boundaries between different image regions, or to properties of such a region, or any other appropriate characteristics of the image or image sequences. Further, a feature representation may include information representing any one or more specific feature (e.g., in terms of a specific structure in the image data). An instance of a feature representation may be referred to as a feature descriptor, or descriptor.

The electronic device 200 may extract features of the LR video (i.e., image frames of the LR video) using a feature extraction module, and the extracted features may then be used by the alignment module to align frames and to generate the feature representations of aligned frames. The alignment module may also directly learn alignment filters to align multiple frames without extracting motion features explicitly and to generate the feature representations of aligned frames.

The electronic device 200 may extract features based on the LR video as well as other related information, such as the type, resolution, format of the LR video, to generate the feature representations of aligned frames or create feature descriptors of the LR video based on certain VCM standard. These parameters of the LR video may also be stored/transferred to the server for decoding processing and other processing.

To generate HR videos, the extracted feature representations of the LR videos need to maintain the resolution of the LR video. That is, for each pixel in the LR video at spatial location (x, y) and time t, a set of features f (x, y, t) is extracted as its representation. The set of features f (x, y, t) is usually computed by DNNs as responses of their output feature maps, and the VCM standard (which generates multiple feature maps through neural network backbones) can be used to extract such feature representations.

Figure 9:
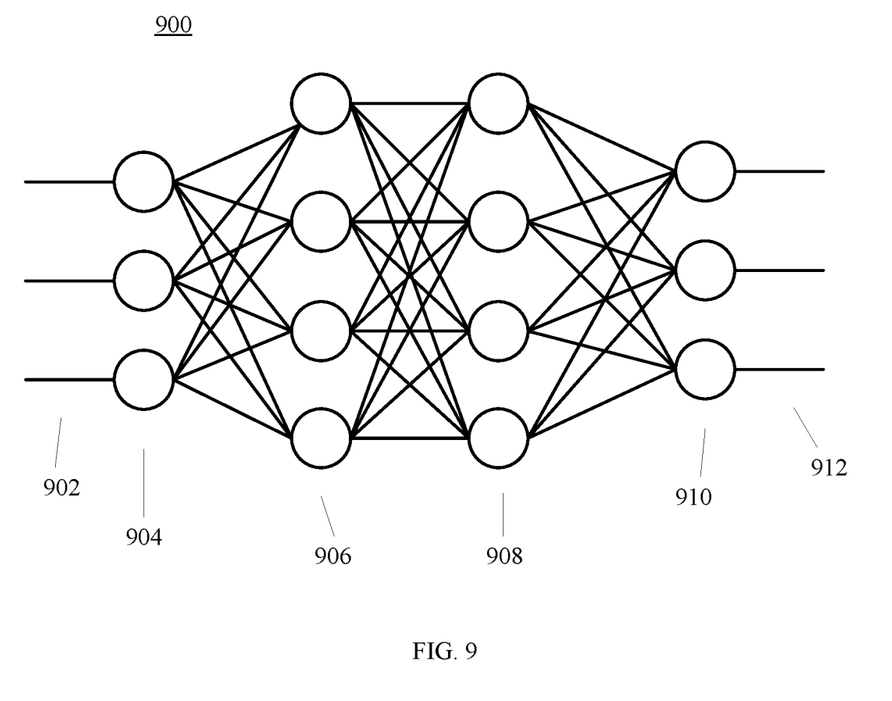
FIG. 9 illustrates a DNN consistent with embodiments of the present disclosure.

Specifically, for example, as shown in FIG. 4, given an LR video, the alignment module 410 may first align neighboring video frames and compute a feature representation of aligned frames. A DNN may be used by the alignment module 410 for this purpose, such as the enhanced deformable convolution network that applies deformable convolution to align features from neighboring frames, or the DNN may directly learn dynamic up-sampling filters without extracting local features explicitly. FIG. 9 illustrates an exemplary DNN consistent with the disclosed embodiments of the present disclosure.

As shown in FIG. 9, the deep neural network 900 may include an input layer 904, middle layers 906 and 908 (hidden layers), and an output layer 910, etc. The hidden layers may also include a convolutional layer when the DNN 900 is a convolutional DNN. The convolutional layer may include a predetermined number of feature maps and filters. The convolutional layer may be the core building block of the DNN. The layer's parameters consist of a set of learnable filters (or kernels), which have a small receptive field, but extend through the full depth of the input volume. During the forward pass, each filter is convolved across the width and height of the input volume, computing the dot product between the entries of the filter and the input, and producing a 2-dimensional activation map of that filter. Thus, the network learns filters that activate when it detects some specific type of feature at some spatial position in the input. Further, stacking the activation maps for all filters along the depth dimension forms the full output volume of the convolution layer. Every entry in the output volume can thus also be interpreted as an output of a neuron that looks at a small region in the input and shares parameters with neurons in the same activation map. Other schemes may also be used.

As explained above, the feature representations of the LR video may be referred to as features f (x, y, t), which treats space and time as equivalent dimensions of the input and perform convolutions in both time and space. Alternatively and/or additionally, features of two convolutional neural networks, one for the spatial and one for the temporal stream may be fused together to generate the feature representation.

Input 902 are provided to the input layer 904, and output 912 are provided by the output layer 910. Each layer may include one or more neural-network node. The number of the neural-network layers are used for illustrative purposes, any number of the neural-network layers may be used. The parameters of the DNN may also be obtained by the electronic device 200 and may also be stored/transferred to the server for decoding processing and other processing.

In certain embodiments, the feature representation of aligned frames may be a 5-dimension tensor with size (w, h, t, n, c), where w and h are the height and width of the LR video frame, t is the length of the LR video, and c is the number of features generated. To generate an HR video frame, a temporal neighborhood of size n is placed around the HR video frame, and the LR video frames within this neighborhood is aligned to the LR video frame corresponding to the HR video frame.

Note that the LR video can take multiple forms or formats. For example, it can be a conventional video where each video frame is a color image in a color space (i.e., 3 values assigned to each pixel). The LR Video can also be a depth video where a video frame is a depth image (i.e., 1 value assigned to each pixel). It can also be a color-depthcombined video where each pixel in a video frame gives both color and depth (i.e., 4 values assigned to each pixel).

After obtaining the feature representations of aligned frames, alternatively, in certain embodiments, the electronic device 200 may use the fusion module 616 (e.g., FIG. 6) to perform a fusion operation on the feature representations to generate fused feature representations. That is, the electronic device 200 may combine feature representations of multiple video frames into a new feature representation to include more feature information for later generating the corresponding HR video.

Returning to FIG. 8, after generating the feature representations or after generating the fused feature representations, the electronic device 200 may encode the feature representations and the LR video to form a bitstream for encoded feature representation and the encoded LR video (S806).

Specifically, the electronic device 200 may use a VCM encoder to encode the feature representations (or the fused feature representations) to generate encoded feature representations (or the encoded fused feature representations), and may use a separate video encoder to encode the LR video to generate encoded LR video. That is, the VCM encoder (e.g., the VCM encoding module) may only encode the future representations using certain VCM standard, such as a high efficiency coding, to achieve high compression efficiency; while the video encoder may encode the LR video using, for example, any appropriate video coding standard, such as advanced video coding (AVC). AVC is a video compression standard based on block-oriented, motion-compensated integer-DCT (discrete cosine transform) coding.

In certain embodiments, the electronic device 200 may first determine a type of target application for the HR video, such as a machine vision or a human vision application, or other types of applications, such as displaying, monitoring, analyzing, detecting, etc. Based the type of applications, the VCM encoder may encode the feature representations or fused feature representations according to the type of applications, such as using a different compression algorithm or a different compression ratio, etc.

Alternatively, the electronic device 200 may use a single VCM encoder to encode the feature representations (or the fused feature representations) to generate the encoded feature representations (or the encoded fused feature representations), and the encoded LR video, without a separate video encoder. As both the LR video and the feature representations are provided to the VCM encoder, in one embodiment, the VCM encoder may determine certain redundant information in the feature representation of aligned frames and the corresponding LR video frames and use the redundant information to further improve the compression efficiency during the encoding process.

Further, the encoded feature representations (or the encoded fused feature representations) and the encoded LR video may be stored and transferred for server-side processing (S808). For example, the encoded feature representations and the encoded LR video may be stored locally on the electronic device 200 or on a separate storage and later transmitted to a server or another device with decoding functionalities. In certain embodiments, the bitstream may be transferred directly in real-time to the server.

The electronic device 200 may also store and/or send specific information about the electronic device 200, such as identifier of the electronic device 200, user account and password information, etc., and/or about the video, such as type of the video, description of the video, and details of the applications for the video, such as the type of applications suitable for the video, e.g., whether the target application is for machine vision or human vision, and/or description of the coding standard/process of the bitstream. The electronic device 200 may also choose different encoding schemes under the VCM standard to encoding different LR videos and/or feature representations for different target applications.

After the server (or any appropriate device with decoding functionalities) receives the encoded feature representations and the encoded LR video (S810), the server may decode the bitstream to generate decoded LR video and decoded feature representation (S812). That is, the server may decode the encoded feature representations and the encoded LR video to generate the decoded LR video and decoded feature representation.

Specifically, the server may use a VCM decoder to decode the encoded feature representations of aligned frames based on the VCM standard to generate the decoded feature representations. The server may use a separate video decoder to decode the encoded LR video to generate a decoded LR video based on a video coding standard (e.g., ADC). In certain embodiments, when the VCM encoder encodes both the feature representations and the LR video, the server may use the VCM decoder to decode both the encoded feature representations of aligned frames and the encoded LR video to generate the decoded feature representations and the decode LR video.

After generating the decode feature representations of the aligned frames, the electronic device 200 may use the fusion module to process the decoded feature representation of aligned frames to generate a fused feature representation. In certain embodiments, the decoded feature representation of aligned frames is a 5-dimension tensor of size (w, h, t, n, c) which is the same with the feature representation of aligned frames before the VCM encoder. The fusion module may aggregate features from different channels, spatial, and temporal locations, resulting in a new 5-dimension tensor of size (w, h, t, n', c'). For example, convolution neural network layers can be configured for this computation.

In certain embodiments, when the electronic device 200 uses the fusion module to fuse the feature representations before encoding the feature representation, the received encoded future representations may be the encoded fused feature representations. The server may use the VCM decoder to decode the encoded fused feature representations to generate the decoded fused feature representations.

Further, the server may perform a reconstruction process to create an HR video based on the LR video and the fused feature representations (S814). Specifically, based on the fused feature representation and the decoded LR video, the reconstruction module generates an HR video frame for each LR video frame. In certain embodiments, a set of up-sampling neural network layers are used by the reconstruction module, where for each pixel in spatial location (x,y) of the HR video at temporal location k, the corresponding features of the fused feature representation in the 5-dimension tensor of size (w, h, t, n', c') within a spatial neighborhood S(x,y) and a temporal neighborhood T(k), and the corresponding pixels in the LR video frame, are aggregated (e.g., through convolution computation) to generate the values assigned to that pixel.

When the fusion module is placed before the VCM encoder, the fusion module processes the feature representation of aligned frames to generate the fused feature representation. As mentioned before, the feature representation of aligned frames is a 5-dimension tensor of size (w, h, t, n, c), and the fusion module aggregates features from different channels, spatial, and temporal locations, resulting in a new 5-dimension tensor of size (w, h, t, n', c'). After that, in one embodiment, the VCM encoder encodes the fused feature representation to generate an encoded fused feature representation. At the same time, the LR video is encoded as well. The encoded LR video as well as the encoded fused feature representation are stored and/or transferred for the server. On the decoder side, the corresponding VCM decoder decodes the encoded fused feature representation to generate a decoded fused feature representation, which has the same dimension with the fused feature representation before the VCM encoding. Also, the corresponding LR video is decoded to generate the decoded LR video.

In another embodiment, when the VCM encoder encodes both the fused feature representation and the LR video to generate the encoded fused feature representation and the encoded LR video. On the decoder side, the VCM decoder decodes both the encoded fused feature representation and the encoded LR video to generate the decoded fused feature representation and the decoded LR video. Similar to the encoding process, the VCM decoder may use the redundant information in the fused feature representation and the corresponding LR video frames to improve the compression efficiency.

Based on the decoded fused feature representation and the decoded LR video, the reconstruction module generates the HR video frame for each LR video frame. In certain embodiments, a set of up-sampling neural network layers may be used, where for each pixel in spatial location (x,y) of the HR video at temporal location k, the corresponding features of the decoded fused feature representation in the 5-dimension tensor of size (w, h, t, n', c') within a spatial neighborhood S(x,y) and a temporal neighborhood T(k), and the corresponding pixels in the LR video frame, are aggregated (e.g., through convolution computation) by the reconstruction module to generate the values assigned to that pixel.

After the HR video is generated, the server may present the HR video to a corresponding user or user application for further processing and applications (S816). For example, the server may also retrieve or receive from the electronic device other specific information on the electronic device 200, as well as information on the target applications and coding schemes of the LR video. Based on such specific information, the server may send the HR video to different target applications.

For example, if the target application is a machine vision application, the server may send the HR video to a corresponding machine vision application for image analysis and/or object detection. The results of the image analysis and/or object detection may further be processed and presented by the corresponding application. If the target application is a human vision application, the server may send the HR video to a corresponding human vision application such that the HR video may be played back for a user, etc. Any appropriate type of application may be used.

By using the disclosed methods and systems, video SR is no longer only treated as a simple extension of image SR, which conduct image SR frame by frame. Instead, the temporal information in videos may also be used to take more sophisticated approaches. Further, a DNN-based video SR method may greatly outperform the traditional interpolation algorithms for video SR Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A video super resolution (SR) method based on video coding for machine (VCM), comprising:
   obtaining, by an electronic device, a lower resolution (LR) video;
   generating, by the electronic device, feature representations of the LR video based on a deep neural network (DNN);
   encoding, by the electronic device, the feature representations of the LR video, based on a video coding method for machine vision, and the LR video to form encoded feature representations of the LR video and an encoded LR video, wherein the feature representations of the LR video contain both space and temporal information on the LR video for creating a high resolution (HR) video corresponding to the LR video; and
   storing and transferring, by the electronic device, the encoded feature representations of the LR video and an encoded LR video for decoding,
   wherein generating, by the electronic device, the feature representations of the LR video based on the DNN comprises:
     aligning frames of the LR video, wherein the aligned frames are obtained based on motion features extracted from video frames of the LR video or obtained from directly learning alignment filters without extracting the motion features; and
     generating feature representations of the aligned frames as the feature representations of the LR video,
     wherein the feature representations of the aligned frames are defined by a 5-dimension tensor with a size (w, h, t, n, c), where w and h are height and width of an LR video frame, t is a time length of the LR video, c is a number of features generated, and n is a size of a temporal neighborhood of LR video frames within which the LR video frame correspond to an HR video frame to be generated.

2. The video SR method according to claim 1, further comprising:
   receiving, by a server entity, the encoded feature representations of the LR video and an encoded LR video;
   decoding, by the server entity, the encoded feature representations of the LR video based on the video coding method for machine vision, and the encoded LR video to generate decoded feature representations of the LR video and a decoded LR video;
   performing, by the server entity, a reconstruction process based on the decoded feature representations of the LR video and the decoded LR video to create the HR video corresponding to the LR video; and
   presenting, by the server entity, the HR video to a corresponding user application, wherein the user application is a machine vision application that performs visual search or visual analysis based on the HR video.

3. The video SR method according to claim 2, wherein the performing, by the server entity, a reconstruction process further comprises:
   performing, by the server entity, a fusion process on the decoded feature representations of the LR video to form fused feature representations of the LR video; and performing, by the server entity, the reconstruction process on the fused feature representations of the LR video and the decoded LR video to form the HR video.

4. The video SR method according to claim 1, wherein the encoding, by the electronic device, the feature representations of the LR video based on a video coding method for machine vision, and the LR video further comprises:
performing, by the electronic device, a fusion process on the feature representations of the LR video to generate fused feature representations of the LR video; and
encoding, by the electronic device, the fused feature representations of the LR video to form the encoded feature representations of the LR video based on the video coding method for machine vision.

5. The video SR method according to claim 4, wherein:
the decoding, by the server entity, the encoded feature representations of the LR video based on the video coding method for machine vision, and the encoded LR video further comprises:
decoding, by the server entity, the encoded fused feature representations of the LR video to form decoded fused feature representations of the LR video, and
wherein the performing, by the server entity, a reconstruction process further comprises:
performing, by the server entity, the reconstruction process on the decoded fused feature representations of the LR video and the decoded LR video to form the HR video.

6. The video SR method according to claim 2, wherein:
the encoding, by the electronic device, the feature representations of the LR video based on a video coding method for machine vision, and the LR video further comprises:
using, by the electronic device, a VCM encoder to encode the feature representations of the LR video based on the video coding method for machine vision to form the encoded feature representations of the LR video; and
using, by the electronic device, a separate and independent video encoder to encode the LR video based on a video coding standard to form the encoded LR video,
the decoding, by the server entity, the encoded feature representations of the LR video based on the video coding method for machine vision, and the encoded LR video further comprises:
using, by the server entity, a VCM decoder to decode the encoded feature representations of the LR video based on the video coding method for machine vision to form the decoded feature representations of the LR video; and
using, by the server entity, a separate and independent video decoder to decode the encoded LR video to form the decode LR video.

7. The video SR method according to claim 2, wherein:
the encoding, by the electronic device, the feature representations of the LR video based on a video coding method for machine vision, and the LR video further comprises:
using, by the electronic device, a single VCM encoder to encode the feature representations of the LR video based on the video coding method for machine vision to form the encoded feature representations of the LR video, and to encode the LR video based on a video coding standard to form the encoded LR video,
the decoding, by the server entity, the encoded feature representations of the LR video based on the video coding method for machine vision, and the encoded LR video further comprises:
using, by the server entity, a single VCM decoder to decode the encoded feature representations of the LR video based on the video coding method for machine vision to form the decoded feature representations of the LR video, and to decode the encoded LR video to form the decode LR video.

8. The video SR method according to claim 7, wherein the VCM encoder and the VCM decoder determine redundant information between the feature representations of the LR video and the LR video, and perform encoding and decoding with the redundant information to improve coding efficiency.

9. A video super resolution (SR) system based on video coding for machine (VCM), comprising an electronic device configured to perform:
obtaining a lower resolution (LR) video;
generating feature representations of the LR video based on a deep neural network (DNN);
encoding the feature representations of the LR video, based on a video coding method for machine vision, and the LR video to form encoded feature representations of the LR video and an encoded LR video, wherein the feature representations of the LR video contain both space and temporal information on the LR video for creating a high resolution (HR) video corresponding to the LR video; and
storing and transferring the encoded feature representations of the LR video and an encoded LR video for decoding,
wherein generating the feature representations of the LR video based on the DNN comprises:
aligning frames of the LR video, wherein the aligned frames are obtained based on motion features extracted from video frames of the LR video or obtained from directly learning alignment filters without extracting the motion features; and
generating feature representations of the aligned frames as the feature representations of the LR video,
wherein the feature representations of the aligned frames are defined by a 5-dimension tensor with a size (w, h, t, n, c), where w and h are height and width of an LR video frame, t is a time length of the LR video, c is a number of features generated, and n is a size of a temporal neighborhood of LR video frames within which the LR video frame correspond to an HR video frame to be generated.

10. The video SR system according to claim 9, further comprising a server entity configured to perform:
receiving the encoded feature representations of the LR video and an encoded LR video;
decoding the encoded feature representations of the LR video based on the video coding method for machine vision, and the encoded LR video to generate decoded feature representations of the LR video and a decoded LR video;
performing a reconstruction process based on the decoded feature representations of the LR video and the decoded LR video to create the HR video corresponding to the LR video; and
presenting the HR video to a corresponding user application, wherein the user application is a machine vision application that performs visual search or visual analysis based on the HR video.

11. The video SR system according to claim 10, wherein the performing a reconstruction process further comprises:

performing a fusion process on the decoded feature representations of the LR video to form fused feature representations of the LR video; and performing the reconstruction process on the fused feature representations of the LR video and the decoded LR video to form the HR video.

12. The video SR system according to claim 9, wherein the encoding the feature representations of the LR video based on a video coding method for machine vision, and the LR video further comprises:

performing a fusion process on the feature representations of the LR video to generate fused feature representations of the LR video; and encoding the fused feature representations of the LR video to form the encoded feature representations of the LR video based on the video coding method for machine vision.

13. The video SR system according to claim 12, wherein:

the decoding the encoded feature representations of the LR video based on the video coding method for machine vision, and the encoded LR video further comprises:

decoding the encoded fused feature representations of the LR video to form decoded fused feature representations of the LR video, and wherein the performing a reconstruction process further comprises:

performing the reconstruction process on the decoded fused feature representations of the LR video and the decoded LR video to form the HR video.

14. The video SR system according to claim 10, wherein:

the encoding the feature representations of the LR video based on a video coding method for machine vision, and the LR video further comprises:

using a VCM encoder to encode the feature representations of the LR video based on the video coding method for machine vision to form the encoded feature representations of the LR video; and using a separate and independent video encoder to encode the LR video based on a video coding standard to form the encoded LR video, the decoding the encoded feature representations of the LR video based on the video coding method for machine vision, and the encoded LR video further comprises:

using a VCM decoder to decode the encoded feature representations of the LR video based on the video coding method for machine vision to form the decoded feature representations of the LR video; and using a separate and independent video decoder to decode the encoded LR video to form the decode LR video.

15. The video SR system according to claim 10, wherein:

the encoding the feature representations of the LR video based on a video coding method for machine vision, and the LR video further comprises:

using a single VCM encoder to encode the feature representations of the LR video based on the video coding method for machine vision to form the encoded feature representations of the LR video, and to encode the LR video based on a video coding standard to form the encoded LR video, the decoding the encoded feature representations of the LR video based on the video coding method for machine vision, and the encoded LR video further comprises:

using a single VCM decoder to decode the encoded feature representations of the LR video based on the video coding method for machine vision to form the decoded feature representations of the LR video, and to decode the encoded LR video to form the decode LR video.

16. The video SR system according to claim 15, wherein the VCM encoder and the VCM decoder determine redundant information between the feature representations of the LR video and the LR video, and perform encoding and decoding with the redundant information to improve coding efficiency.

* * * * *